March 11, 1958 — T. G. HOEY — 2,825,969
BUTTER SLICER
Filed March 8, 1956 — 2 Sheets-Sheet 1

INVENTOR.
THOMAS G. HOEY
BY
Fulwider, Mattingly & Huntley
ATTORNEYS

March 11, 1958
T. G. HOEY
2,825,969
BUTTER SLICER
Filed March 8, 1956
2 Sheets-Sheet 2
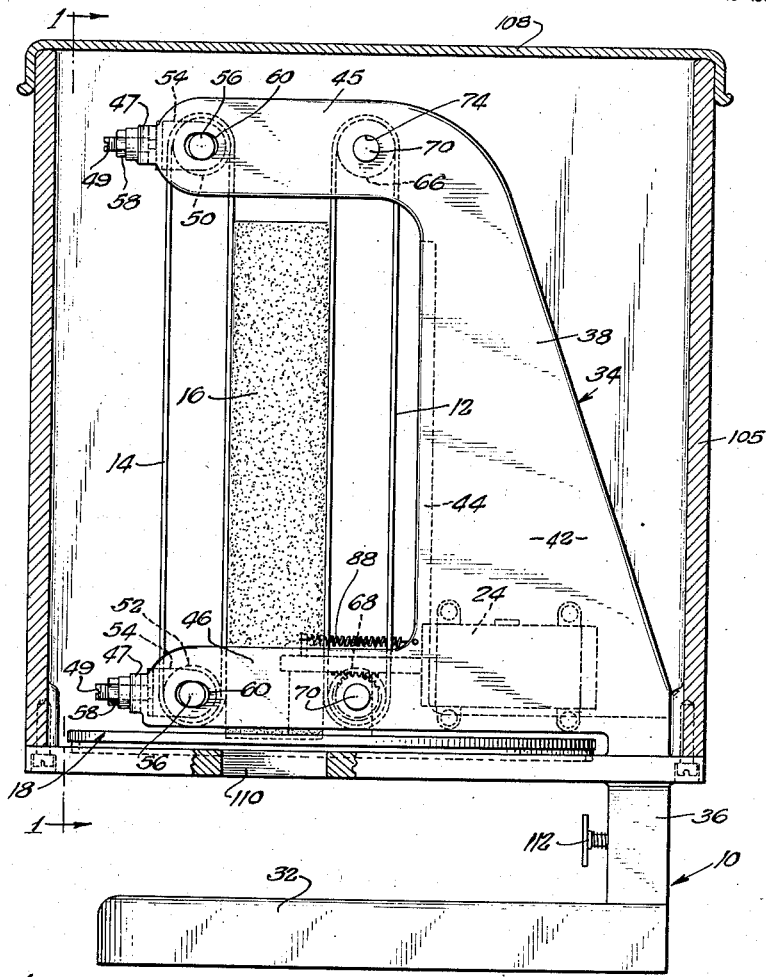
Fig. 2
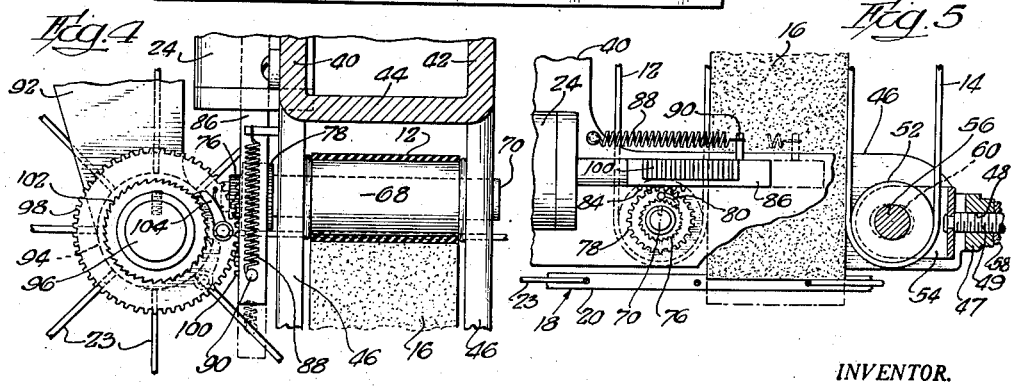
Fig. 4
Fig. 5
INVENTOR.
THOMAS G. HOEY
BY
Fulwider, Mattingly + Huntley
ATTORNEYS

United States Patent Office 2,825,969
Patented Mar. 11, 1958

2,825,969
BUTTER SLICER

Thomas G. Hoey, Rockford, Ill., assignor of one-half to Edward E. Grazia, Long Beach, Calif.

Application March 8, 1956, Serial No. 570,294

6 Claims. (Cl. 31—21)

The present invention relates generally to culinary apparatus and more particularly to a new and novel butter slicer.

It is a major object of the present invention to provide a device which will slice an elongated column of butter into a plurality of pats or squares of butter. This butter slicer is particularly adapted for use in food serving establishments and provides butter pats in the most sanitary manner possible.

Another object is to provide a butter slicer which is simple in design and rugged of construction whereby it may afford a long and useful service life.

Yet another object of the present invention is to provide a butter slicer which is foolproof in operation.

An additional object is to provide a butter slicer having a minimum of working parts to go out of order and which may be constructed at a comparatively low cost.

A further object is to provide a butter slicer of the aforedescribed nature which provides butter pats of uniform dimensions.

It is yet another object of the invention to provide a butter slicer of the aforedescribed nature which is extremely simple to clean.

It is a more particular object of the invention to provide a butter slicer which may be automatically actuated when engaged by the receptacle upon which the butter pats are to be deposited.

These and other objects and advantages of the present invention will become apparent from the following detailed description and a preferred embodiment thereof, when taken in conjunction with the appended drawings, wherein:

Figure 2 is a vertical sectional view taken on line 2—2 of Figure 1;

Figure 4 is a fragmentary horizontal sectional view taken along line 4—4 of Figure 1;

Figure 5 is a fragmentary vertical sectional view taken along line 5—5 of Figure 1.

Figure 1:
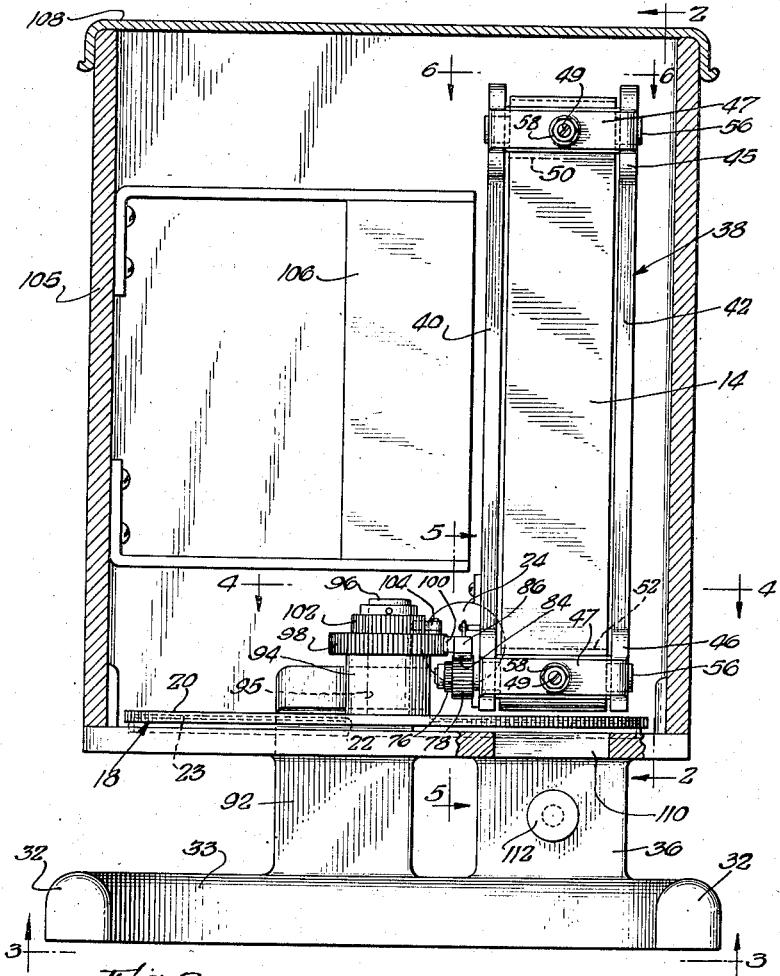
Figure 1 is a vertical sectional view of a butter slicer embodying the present invention, taken on line 1—1 of Figure 2.
Figure 3:
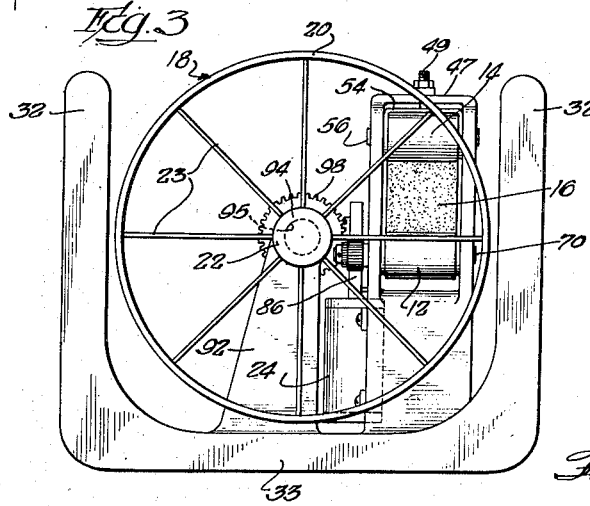
Figure 3 is a bottom view taken along line 3—3 of Figure 1 of said butter slicer.

Referring to the drawings, the preferred form of butter slicer embodying the present invention includes a frame, generally designated 10, which supports an aligned pair of belts 12 and 14. The belt 12 is hereinafter termed the "driver" belt and the belt 14 is hereinafter termed the "idler" belt. The belts 12 and 14 cooperate to support a vertically extending elongated column of butter 16. The lower portion of the frame 10 supports a butter slicing means 18 towards which the butter column 16 is moved by the driver belt 12. This butter slicing means 18 takes the form of a cutter wheel having a rigid rim 20, a hub 22 and a plurality of radially extending cutter wires 23 interconnecting the rim and the hub. The driver belt 12 and the cutter wheel 18 are both actuated by an electric solenoid 24 shown mounted at the rear portion of the frame 10. Suitable indexing means, to be fully described hereinafter, are interposed between the driver belt 12 and the cutter wheel 18 for advancing the butter column 16 through a predetermined longitudinal distance for each slicing movement of the cutter wheel.

Figure 6:
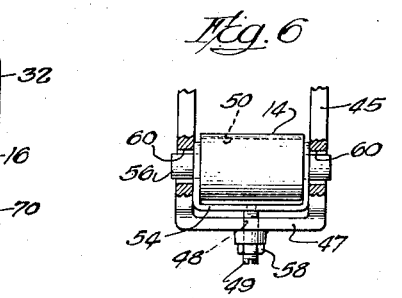
Figure 6 is a horizontal sectional view taken on line 6—6 of Figure 1.

More particularly, the frame 10 includes a generally U-shaped base having mounting feet 32 connected by a cross-piece 33. An upstanding belt support member 34 extends upwardly from the cross-piece 33. This belt support member 34 is of integral construction and includes a flat post 36 secured at its lower end to the cross-piece 33. The upper end of this post 36 merges into the lower end of a bifurcated belt-holding structure 38. The side plates 40 and 42 of the latter structure are rigidly interconnected by a vertical web 44. The front portion of these side plates 40 and 42 include a pair of upper and lower forwardly extending arms 45 and 46, respectively. As shown particularly in Figure 6, the front end of these arms are integrally interconnected by cross-pieces 47. The mid-portion of each cross-piece 47 is formed with a threaded bore 48 wherein is disposed a horizontal adjustment bolt 49. The idler belt 14 is supported between upper and lower rollers 50 and 52. These rollers in turn are each supported by a U-shaped element 54, the midportion of which is rigidly affixed to one of the adjustment bolts 49. The side arms of each U-shaped element 54 carry a horizontal roller-supporting shaft 56. The ends of these shafts 56 are slidably disposed within elongated slots 60 formed in the front portion of the arms 45 and 46. A lock nut 58 is provided for each adjustment bolt 49.

The driver belt 12 is carried between a similar pair of rollers 66 and 68. These latter rollers are supported by upper and lower shafts 70, having their ends carried in horizontally aligned bores 74 formed in the arms 45 and 46. Both the idler belt 14 and the driver belt 12 are formed of a material which affords considerable resistance against skidding. The adjustable mounting of the idler belt 14 relative to the driver belt 12 provides a tolerance for any discrepancies in the dimensions of the columns of butter which may be employed with the device.

Referring to Figure 5, the lower shaft 72 of the driver belt assembly is keyed to a ratchet gear 76. A driving pinion 78 of larger diameter is journaled by this shaft 72 adjacent the ratchet gear 76. A latch dog 80 is pivotally carried at one of its ends by the driving pinion 78. The pointed end of the latch dog 80 is engageable with the teeth of the driving pinion. With this arrangement, rotation of the driving pinion 78 will be transferred to the ratchet gear 76 only when the driving pinion rotates in a clockwise direction relative to Figure 5. The teeth of the driving pinion 78 are meshed with a first set of teeth 84 formed on one side of the plunger 86 of the electric solenoid 24. Thus, the plunger 86 serves as a rack in effecting rotation of the driving pinion as it is moved in and out of the body of the solenoid. The plunger 86 is constantly biased towards a retracted position by means of a helical tension spring 88, one end of this spring being secured to an upstanding post 90 formed near the free end of the solenoid plunger and the opposite end being rigidly affixed to the frame 10.

The cutter wheel 18 is supported by means of a generally L-shaped support 92 which is integrally secured at its lower end to the cross-piece 33 of the frame 10. The free end of this support 92 is formed with a boss 94 having a vertical bore 95. The hub 22 of the cutter wheel is rigidly affixed to an upstanding shaft 96. This shaft is rotatably carried within the bore 95 of the boss 94. The shaft 96 journals a driving pinion 98 above the boss 94. Referring to Figure 5, the teeth of this driving pinion 98 are meshed with a second set of teeth 100 formed on the solenoid plunger 86. A ratchet gear 102 of smaller diameter than the driving pinion is keyed to the upper end of the cutter wheel shaft 96. A latch dog 104 is pivotally carried at one of its ends by the driving pinion 98. The pointed end of this latch dog 104 is engageable with the teeth of the ratchet gear. With this arrangement, rotation of the driving pinion 98 will be transferred to the ratchet gear 102 only when the driving pinion rotates in a counter-clockwise direction relative to Figure 4.

Preferably, a housing 105 will be provided for the upper portion of the frame 10. The interior of this housing 105 may be cooled by means of a suitable refrigeration coil 106. Alternately, Dry Ice may be employed to cool the interior of the housing. Access to the interior of the housing may be provided by a removable cover 108. As indicated in Figures 1 and 2, an opening 110 is formed in the lower wall of the housing by means of which the butter pats may drop out of the housing.

The windings of the electric solenoid 24 are energized under the control of a suitable electric switching means such as a microswitch 112 shown mounted on the front of the post 36. With this arrangement, it is possible to engage the microswitch 112 with the edge of a plate or other receptacle (not shown) upon which the butter pats are to be deposited. This arrangement eliminates any need for the operator to touch the device with his hands and in the case of a waiter or waitress who may be required to carry several plates this will be of a distinct advantage.

The plunger 86 of the solenoid 24 is adapted to be moved forwardly, or to the left in Figure 2, when the solenoid windings are energized. When the flow of electric current to the solenoid windings is cut off the plunger 86 will be retracted by means of the tension spring 88. Thus, upon energization of the solenoid windings, the solenoid plunger 86 will move forwardly or to the right relative to Figure 5. Such movement of the plunger will effect clockwise rotation of the driving pinion 78. Such clockwise rotation of the driving pinion 78 will effect concurrent clockwise rotation of the ratchet gear 76, and hence the lower shaft 72. The driver belt 12 will thus be caused to undergo movement. This movement of the driver belt 12 will urge the butter column 16 downwardly a predetermined distance to its dotted line position of Figure 5. During this forward movement of the solenoid plunger 86 its teeth 100 will effect concurrent clockwise rotation of the cutter wheel's driving pinion 98 relative to Figure 4. Such clockwise rotation of this driving pinion, however, will not have any effect on the ratchet gear 102. Hence, the cutter wheel 18 will remain stationary during this forward movement of the solenoid plunger. As the solenoid plunger is retracted, however, it will effect counter-clockwise rotation of the cutter wheel's driving pinion 98. During such counter-clockwise rotation the pointed end of the latch dog 104 will effect concurrent counter-clockwise rotation of the ratchet gear 102. Hence, the cutter wheel 18 will be rotated through a predetermined number of degrees and one of its cutter wires 23 will slice off the lower portion of the butter column 16. This butter pat will drop through the housing opening 110. During this return movement of the solenoid plunger, the driving pinion 78 of the driver belt assembly will be rotated in a counter-clockwise direction relative to Figure 5. Such rotation, however, will not be transferred to the ratchet gear 76.

While there has been shown and described hereinbefore what is presently considered to be the preferred embodiment of the present invention, it will be apparent that various changes and modifications may be made thereto without departing from the spirit of the invention or the scope of the following claims.

I claim:

1. A butter slicer for use with an elongated column of butter, comprising: a frame; a cutter wheel rotatably carried by said frame and including a plurality of radially extending cutter wires; belt means on said frame for supporting said butter column and for advancing it along a longitudinal axis parallel to the axis of rotation of said cutter wheel and spaced to one side thereof; an electric solenoid on said frame having a reciprocating plunger; and drive means for said cutter wheel and said belt means operatively connected with said plunger, said drive means including ratchet elements whereby movement of said plunger in one direction will cause said belt means to advance said butter column through a predetermined longitudinal distance past said cutter wheel while said cutter wheel remains stationary and movement of said plunger in the opposite direction will effect rotation of said cutter wheel through a number of degrees substantially equal to the angular spacing of said cutter wires while said belt means remains stationary.

2. A butter slicer as set forth in claim 1 wherein said belt means is enclosed within a housing formed with an opening aligned with the longitudinal axis of said butter column, and said electric solenoid is controlled by a switch located exterior to said housing and below said opening.

3. A butter slicer as set forth in claim 1 wherein said belt means includes a driver belt connected to said drive means and an idler belt aligned therewith and adjustable towards and away therefrom.

4. A butter slicer as set forth in claim 1 wherein said drive means includes a first shaft for operating said cutter means, a second shaft for operating said belt means, a ratchet gear keyed to each of said shafts, a driving pinion journaled by each of said shafts, a latch dog interposed between the driving pinion and ratchet gear of each shaft, and two sets of teeth formed on said solenoid plunger, one set being engaged with one of said driving pinions and the other set being engaged with the other driving pinion.

5. A butter slicer as set forth in claim 4 wherein said belt means is enclosed within a housing formed with an opening aligned with the longitudinal axis of said butter column, and said electric solenoid is controlled by a switch located exterior to said housing and below said opening.

6. A butter slicer as set forth in claim 5 wherein said belt means includes a driver belt connected to said drive means and an idler belt aligned therewith and adjustable towards and away therefrom.

References Cited in the file of this patent

UNITED STATES PATENTS

| 856,085 | McNally | June 4, 1907 |
| 2,060,540 | Straeten | Nov. 10, 1936 |
| 2,260,747 | Heft et al. | Oct. 28, 1941 |
| 2,616,173 | Perkins | Nov. 4, 1952 |